United States Patent [19]

Hamilton

[11] Patent Number: 5,044,409
[45] Date of Patent: Sep. 3, 1991

[54] FORCE MATCHING TREE SHEAR

[76] Inventor: Douglas D. Hamilton, 139 Lazard Avenue, Town of Mount Royal, Quebec, Canada

[21] Appl. No.: 605,213

[22] Filed: Oct. 29, 1990

Related U.S. Application Data

[63] Continuation of Ser. No. 447,587, Dec. 8, 1989, abandoned.

[51] Int. Cl.$^5$ ............................................. A01G 23/08
[52] U.S. Cl. ................................. 144/34 E; 30/379.5; 83/604; 83/605; 144/339
[58] Field of Search ................... 144/3 D, 34 R, 34 E, 144/339; 83/604, 605; 30/379.5

[56] References Cited

U.S. PATENT DOCUMENTS

| | | | |
|---|---|---|---|
| 2,129,352 | 9/1938 | Haralson | 83/605 |
| 3,888,287 | 6/1975 | Johnson | 144/34 E |
| 3,946,776 | 3/1976 | Oldenburg et al. | 144/34 E |
| 3,995,671 | 12/1976 | Wirt | 144/34 E |
| 4,100,951 | 7/1978 | Fischer | 144/34 E |
| 4,131,144 | 12/1978 | Fischer | 144/34 E |

FOREIGN PATENT DOCUMENTS 1103130  6/1981  Canada ............................ 144/34 E

*Primary Examiner*—W. Donald Bray
*Attorney, Agent, or Firm*—Stanley E. Johnson

[57] ABSTRACT

A tree shear where the shear blade is moved by a power mechanism that includes a link and lever so arranged that the force available matches approximately, at all times, the force required to pass the shear blade through the tree to sever the same.

8 Claims, 1 Drawing Sheet

FORCE MATCHING TREE SHEAR

This application is a continuation of application Ser. No. 07/447,587, filed Dec. 8, 1989 now abandoned.

FIELD OF INVENTION

This invention relates to an apparatus for cross-cutting trees and more particularly to an arrangement for moving the shear blade during severing of the tree. A shear with such an arrangement provided in accordance with the present invention and in which the force available matches the force required as the blade (or blades) pass through the tree bole is referred to herein as a force matching shear. The embodiment disclosed in the present application can replace the shear disclosed in my Canadian Patent No. 1,103,130 issue Jun. 16, 1981. While Canadian Patent No. 1,103,130 discloses an Accumulating Felling Head of a specific type it will be obvious to anyone skilled in the art that the principles disclosed in the present application can be employed on any type of shear equipped felling head or other cross-cutting device and preferably those where one blade move against an anvil or a fixed blade.

BACKGROUND OF INVENTION

Conventional tree shears employ one or two blades. In two blade shears both can be movable toward one another or one can be fixed and the other move against it. One blade may also move against an anvil. The blade or blades are actuated by one or more hydraulic cylinders. Oil flow for the cylinders is normally provided by a fixed displacement hydraulic pump powered by an internal combustion engine-all as is well known in the art.

Since the mid 1970's, very little work has been done to improve the design of tree severing shears. This has been largely due to the demand for saw severing devices. There has been, however, some rebound in the demand for shears because of the high cost, and hazardous nature of saw operation. The present invention embodies part of my response to this demand.

In 1976, the Canadian Forestry Service published Report FMR-X-93 "Analysis of Shear Felling Trees". It summarized the history and state-of-the-art in tree severing shears and proposed some concepts which the author felt would improve their efficiency by more closely matching the shear force available to that actually required. In my view only one concept showed promise of a significant improvement in the area of force matching. It employed three cylinders, variable length links and a control system for automatically adjusting link lengths. This design has the potential for exact force matching but because of its complexity and bulkiness it is of doubtful utility.

A force matching shear is a shear in which the force available matches the force required as the blade or blades pass through the tree bole. This is illustrated in FIG. 24 of the FMR-X-93 Report. The minimum available force must be at least that force required to sever the largest tree bole for which the shear is designed. Since all components of the shear must be capable of transmitting this force the optimum in force matching is to match the minimum available force.

Virtually all known shears use a cylinder to push the blade or blades through the tree. No force penalty is incurred, because of the rod, as would be the case if the cylinder pulled the blades. In 1978 I considered a design which accepted this penalty in exchange for completely enclosing the cylinder in the housing. The configuration was acceptable at low force requirements but as these requirements increased cylinder dimensions reached impractical proportions and the design was abandoned.

The Felling Head disclosed in my Canadian Patent No. 1,103,130 issued Jun. 16, 1981 has been in commercial use for some years. Commercial pressures are forcing a re-examination of this design and I have reviewed the 1978 work discussed above. This review has led to incorporation of a novel cylinder and lever system which is simple, compact, and which, for all practical purposes, provides optimum force matching.

SUMMARY OF THE INVENTION

A principal object of the present invention is to provide a shear actuating mechanism that includes varying mechanical advantage which, for all practical purposes, will give results approaching optimum force matching on the largest tree diameter to be cut. In such an arrangement the hydraulic oil flow requirement, for all diameters, is reduced as compared to conventional shears, in the order of 40%. The arrangement includes inserting a lever and link into the shear's power train and employing the ratio of lever arm lengths and the angle between them to modify the force generated by the cylinder and to achieve force matching. The arrangement is also such that the shear blade (or blades) is pulled through the tree bole and wherein the hydraulic cylinder (or cylinders) is pressurized on the full piston face to provide the necessary pulling force. In the preferred form the shear actuating cylinder and piston rod thereof is completely enclosed in the frame structure for the shear. The foregoing shear may be used by itself or incorporated with other tree processing or handling functions such as being incorporated in a tree felling head.

LIST OF DRAWINGS

The invention is illustrated by way of example in the accompanying drawing wherein:

FIG. 1 is a partial top plan view with parts broken away for clarity of a shear constructed in accordance with the present invention; and FIG. 2 is a graph illustrating required shearing force and available shear forces of two known shear designs.

DESCRIPTION OF THE PREFERRED EMBODIMENT

Figure 1:
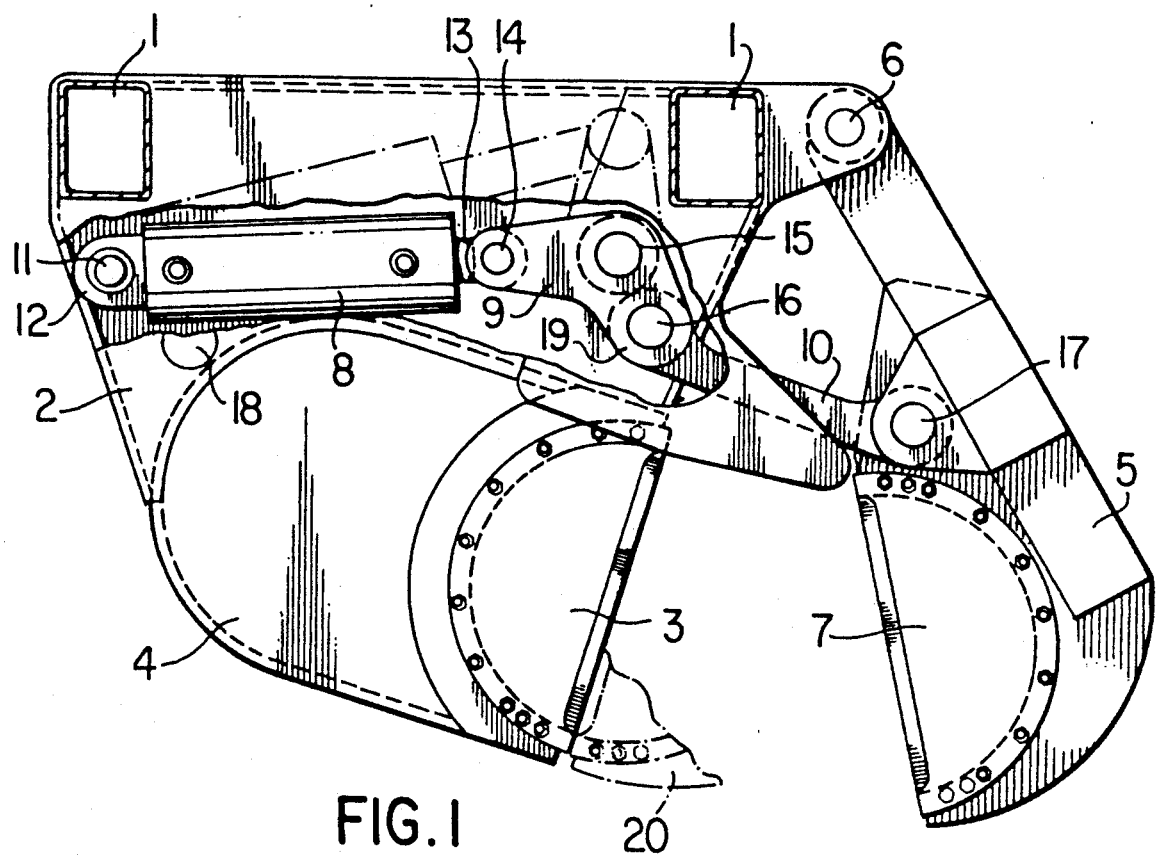

Referring to FIG. 1, there is illustrated the general arrangement of my force matching shear. Posts 1 projecting upwardly from the shear frame 2 provide attachment to a felling head (not shown) of the type disclosed in my aforementioned Canadian Patent No. 1,103,130 issued Jun. 16, 1981 to my company, Logging Development Corporation, or Canadian Patent No. 1,065,742 issued Nov. 6, 1979.

The severing device has a frame 2 with attachment posts 1, fixed shear blade 3 and tree accumulating tray 4. A movable shear arm 5 is pivotally attached to the Frame 2 by a pin 6. Arm 5 is equipped with a shear blade 7 which moves against fixed blade 3 to sever a tree bole. Arm 5 is actuated by a hydraulic cylinder unit 8 through a pivotally mounted lever 9 and a connecting link 10. Hydraulic cylinder 8 is attached at one end to frame 2 by a pin 11 that passes through an adjustably rotatable eccentric 12. Rod 13 of the hydraulic cylinder unit is attached to lever 9 by a pin 14. Lever 9 is pivotally attached to frame 2 by a pivot 15. Link 10 is attached at one end to lever 9 by a pin 16 and at the other end to the pivotally mounted shear arm 5 by a pin 17. As will be evident from FIG. 1, the hydraulic cylinder unit 8 including the piston rod 13 thereof is completely enclosed in the shear frame 2 and thus is protected from damage that can be caused from the harsh environment in which the shear is used.

In operation the force matching shear, alone or as part of a felling head, is attached to a movable carrier. It is advanced until a tree is between blades 3 and 7. Cylinder 8 is then actuated causing lever 9 to rotate about pin 15 in a clockwise direction as seen in FIG. 1. Link 10, because of its connection to lever 9 by pin 16 and arm 5 by pin 17, causes arm 5 and blade 7 to move toward blade 3. It will be obvious that link 10 is under tension during the severing operation. The severing operation is complete when arm 5 and blade 7 reach the position shown in broken line and designated 20. Eccentric 12 is employed to adjust the position of blade 7 in relation to blade 3 to compensate for construction variances or wear. A sweep arm (not shown) pivoted on axis 19 and an accumulating arm (not shown) on axis 18 combine to transfer and retain the cut trees as is well known from Canadian Patent Nos. 1,103,130 or 1,065,742. When tray 4 is full the trees are tilted to a horizontal position and deposited on the ground. Where the shear is employed alone, the trees are allowed to fall as they are cut.

Force matching is accomplished using the foregoing described arrangement and by proper selection of the arm lengths of lever 9 and the angle between them, one of such arm length being the center-to-center distance of pins 14–15 and the c—c of pins 15 and 16. The input torque about pin 15 is a function of the force generated by cylinder 8 and the right angle distance of that force to pin 15. The output force in link 10 is a function of its right angle distance to pin 15 and the input torque. It will be obvious to anyone skilled in the art that the output force characteristic in link 10 can be widely modified by varying the lever arm lengths and the angle between them and that the force characteristic of the blade can be further modified by the location of the link connection, (pin 17), on the shear arm. By experiment I have discovered that a 6"φ cylinder at 2800 p.s.i. hydraulic pressure, coupled to a lever arm (c—c pins 14–15) 8" long, connected at 110° to a lever arm 5½" long (c—c pin 15 –16) can transmit a force through a link to a point on a movable shear arm, all as illustrated in FIG. 1. This force, at the adjacent blade, will match the force required as the blade passes through a 20"φ softwood bole.

Figure 2:
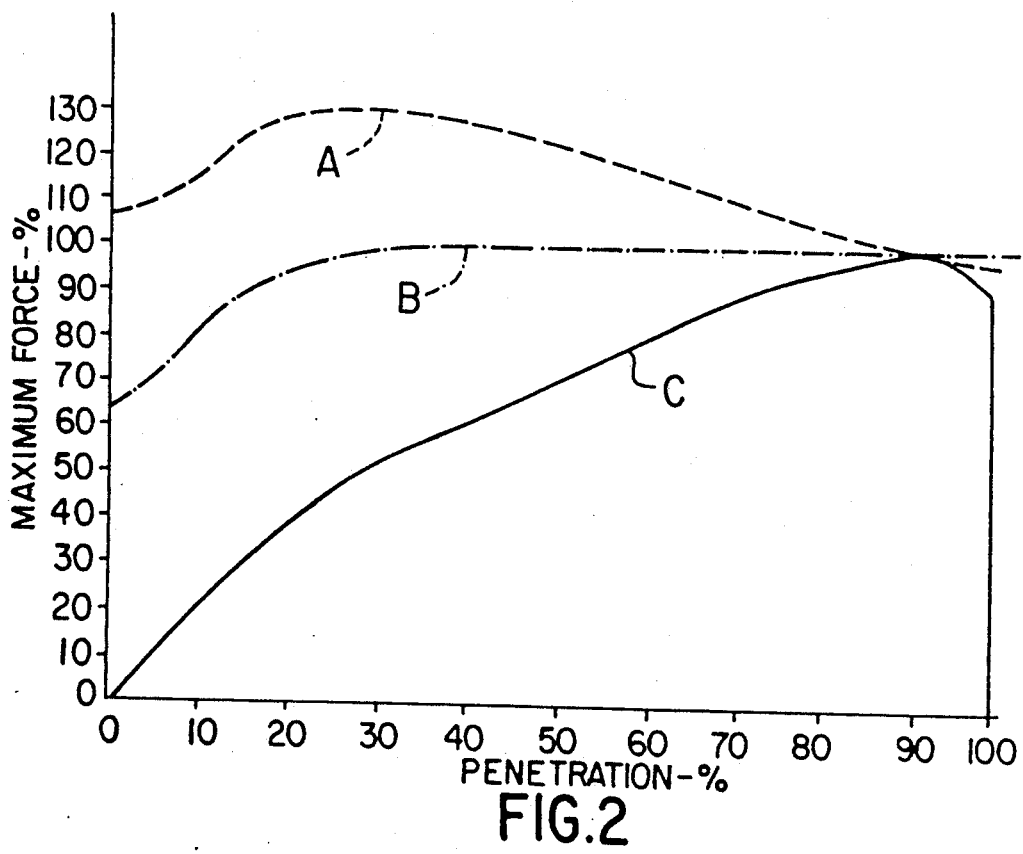

FIG. 2 is a reproduction of the graph referred to in the aforementioned report wherein the two broken lines designated by the applicant A and B represent the shear force available on two different known shear actuating arrangements. The solid line designated C represents the required shearing force. Applicant's foregoing described arrangement provides an available shear force that follows the same line as line C.

I claim:
1. A tree severing shear comprising:
 (a) an elongate frame having a rear portion, a front portion and opposite ends;
 (b) a shear blade arm having a shear blade mounted thereon;
 (c) first pivot means connecting said shear blade arm to said frame at a first position adjacent the rear portion of such frame;
 (d) a lever;
 (e) means pivotly mounting said lever on said frame at a second position;
 (f) A link pivotly connected at one end thereof to said shear blade arm at a location intermediate the shear blade and said first position and pivotly connected at the opposite end to said lever arm at a third position; and
 (g) power means to pivot said shear blade arm so that the shear blade thereon moves toward and away from a tree abutment located on the front portion of said frame and facing said shear blade to sever a tree placed between said abutment and shear blade, said power means comprising a hydraulic piston-cylinder unit pivotally connected at opposite ends respectively to said frame at a fourth position and said lever at a fifth position, said first and fourth positions being in fixed locations relative to the frame and spaced apart from one another longitudinally along said frame, said third and fifth positions being movable relative to said frame in arcuate paths about said second position in directions generally toward and away from a plane intersecting pivot axes at said second and fourth positions, said third and fifth positions on said lever arm and said second position on said frame being so located and the stroke of the piston of said piston-cylinder unit such that in a shear open position said fifth position is adjacent said plane and in a shear jaw closed position, is located spaced from said plane and the opposite of this applying to said third position whereby said third position is remote from said plane when the shear jaw is open and closely adjacent said plane when the shear jaw is closed.

2. A tree shear as defined in claim 1, wherein a second shear blade is mounted on said frame for edge to edge matching with the blade on said shear blade arm in a shear closed position.

3. A tree severing shear as defined in claim 1, wherein said second, third and fifth positions define a generally "L" shaped lever having two arms and wherein said arms are disposed at an angle of approximately 110 degrees to one another.

4. A tree severing shear as defined in claim 3, wherein the ratio of the length of the two arms of the lever is approximately 5.5 to 8.

5. A force matching tree severing shear comprising:
 (a) an elongate frame having a rear portion, a front portion and opposite ends;
 (b) a shear blade arm having a shear blade mounted thereon;
 (c) first pivot means connecting said shear blade arm directly to said frame adjacent one end of said frame at a first position adjacent the rear portion of said frame;
 (d) a generally "L" shaped lever, having first and second legs, pivotly mounted intermediate said legs to said frame at a second position, said second position being intermediate the front and rear portions of said frame;
 (e) a link pivotly connected at one end thereof to said shear blade arm at a location intermediate the shear blade and said first position and pivotly connected at the opposite end to said first leg of the lever arm at a third position; and (f) power means to pivot said shear blade arm so that the shear blade thereon moves toward and away from a tree abutment on the front portion of said frame and facing said shear blade to sever a tree placed between said abutment and shear blade, said power means comprising a hydraulic piston-cylinder unit pivotally connected at opposite ends respectively to said frame at a fourth position and said second leg of said lever at a fifth position, said fourth position being at an end of said frame opposite said one end, said third and fifth positions during a major portion of movement of the shear blade arm being on opposite sides of a plane intersecting the pivot axes at said second and fourth positions and on the sides thereof disposed respectively toward the front and the rear of the frame, said locations of said third and fifth positions and the power of the hydraulic cylinder unit and length of lever arms being such that the shear force available and that required to shear a tree are essentially matched to one another during a tree severing operation.

6. A force matching tree shear as defined in claim 5, wherein a second shear blade is mounted on said frame for edge to edge matching with the blade on said shear blade arm in a shear closed position.

7. A force matching tree severing shear as defined in claim 5, wherein said generally "L" shaped lever has the two arms thereof disposed in an angle of approximately 110 degrees to one another.

8. A force matching tree severing shear as defined in claim 7, wherein the ratio of the length of the two arms of the lever is approximately 5⅜.

* * * * *